April 23, 1929.  T. BOSSARD  1,710,253
VACUUM TANK
Filed May 3, 1926  4 Sheets-Sheet 1
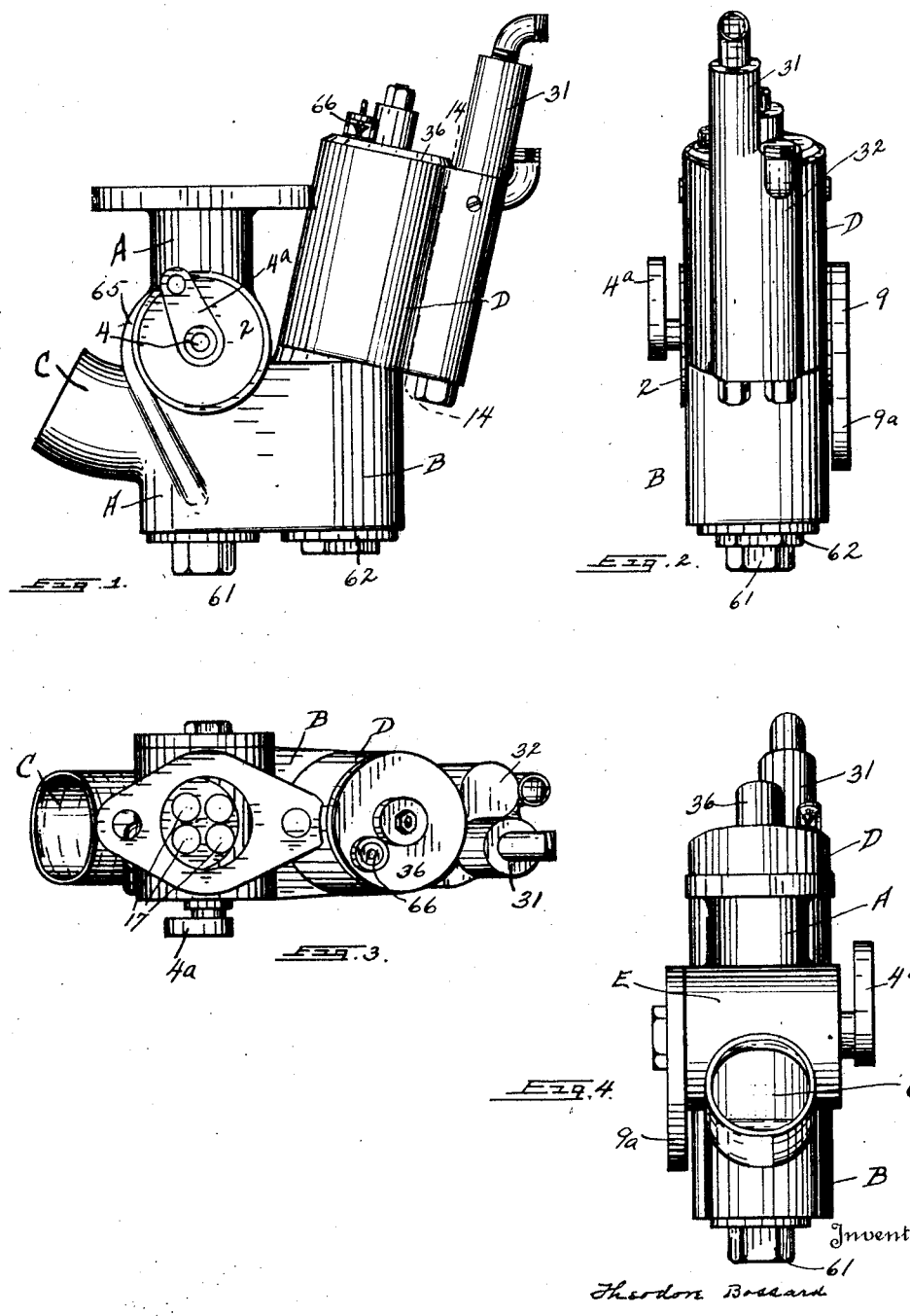
Inventor
Theodore Bossard
By J. M. Thomas
Attorney

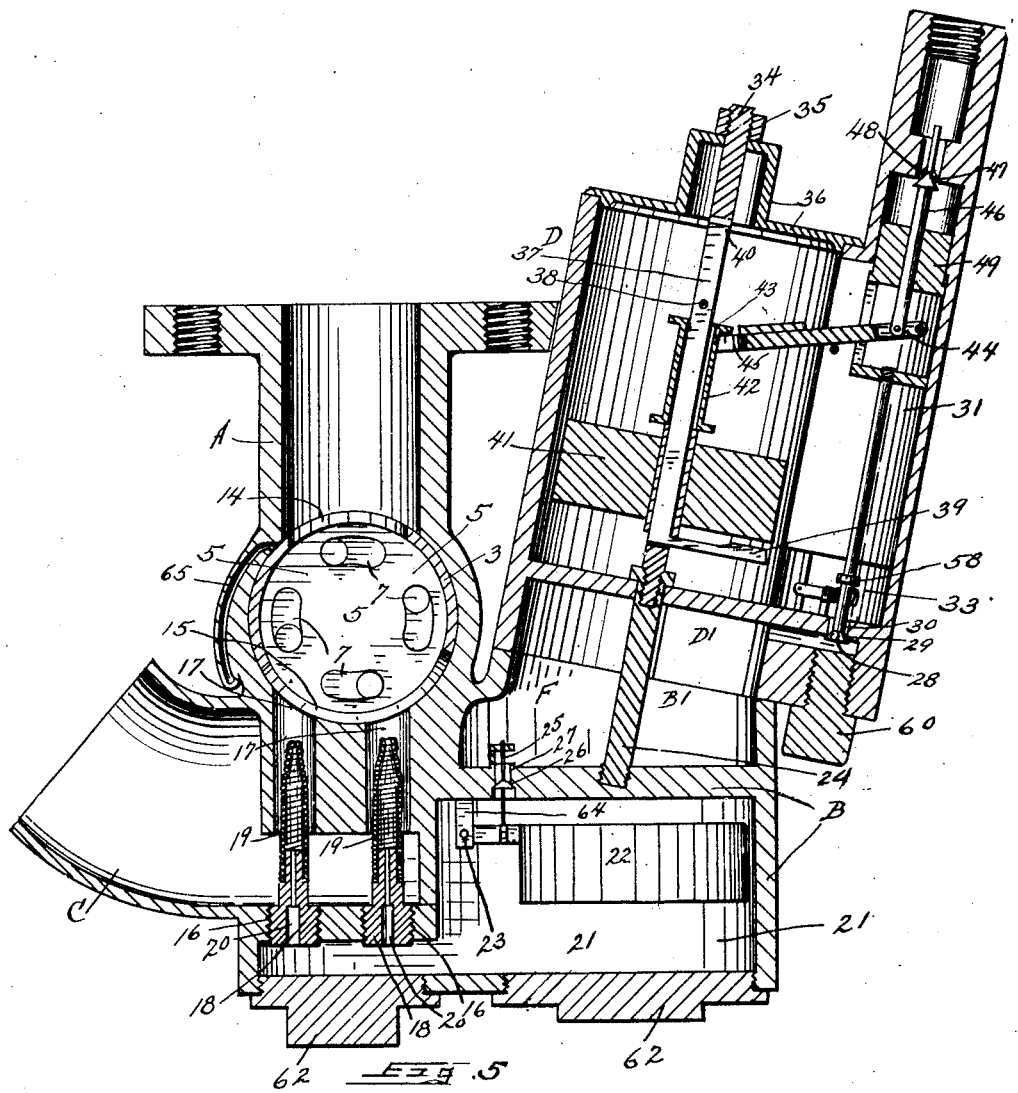

April 23, 1929.  T. BOSSARD  1,710,253
VACUUM TANK
Filed May 3, 1926   4 Sheets-Sheet 3

Inventor
Theodore Bossard

By J. M. Thomas
Attorney

April 23, 1929.  T. BOSSARD  1,710,253

VACUUM TANK

Filed May 3, 1926  4 Sheets-Sheet 4

Inventor
Theodore Bossard
By J. M. Thomas
Attorney

Patented Apr. 23, 1929.

1,710,253

UNITED STATES PATENT OFFICE.

THEODORE BOSSARD, OF SALT LAKE CITY, UTAH, ASSIGNOR TO NATIONAL PRODUCTS INCORPORATED, A CORPORATION OF UTAH.

VACUUM TANK.

Application filed May 3, 1926. Serial No. 106,350.

My invention relates to carburetors and has for its object to provide a new and efficient carburetor for internal combustion engines.

A further object is to provide a new carburetor for internal combustion engines, having a constant flow of gasoline and with the amount of air mixed therewith is controlled by the driver or operator of the engine.

A still further object is to provide a combination carburetor and vacuum tank.

A still further object is to provide a new and efficient vacuum tank and carburetor combined, in which the amount of gasoline in the vacuum tank is controlled by the amount of gasoline used in the carburetor, and both by the amount of air mixed with the gasoline in the carburetor.

These objects I accomplish with the device illustrated in the accompanying drawings in which similar numerals and letters of reference indicate like parts throughout the several views and as described in the specification forming a part of this application and pointed out in the appended claims.

Figure 6:
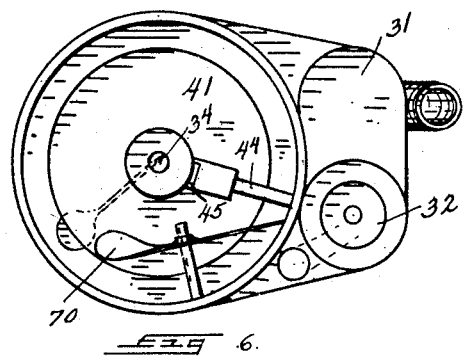
Figure 7:
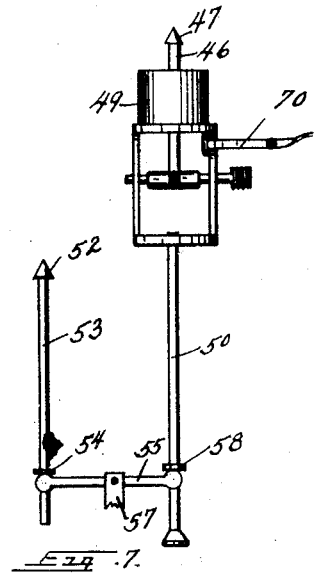
Figure 8:
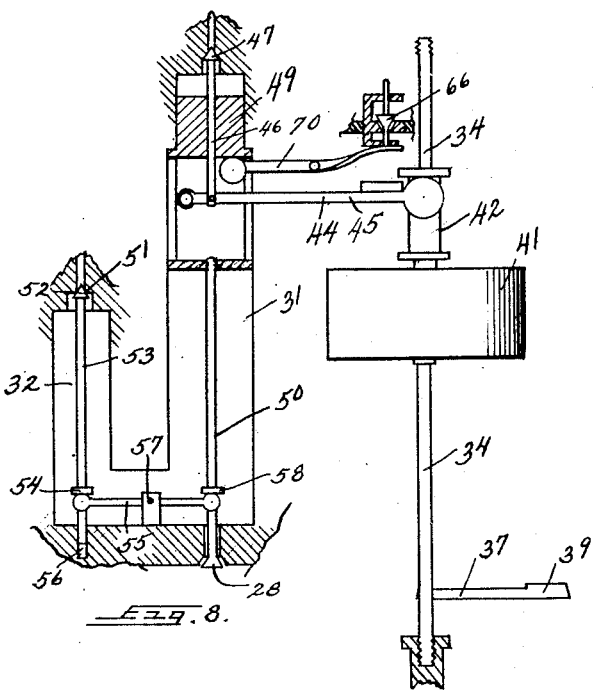
Figure 9:
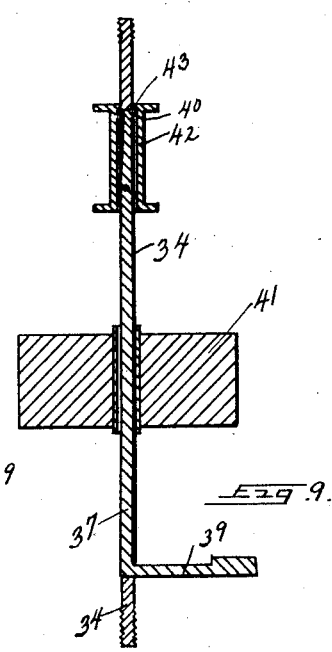
Figure 10:
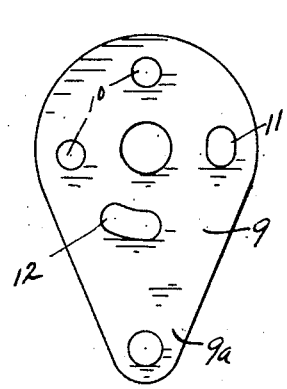
Figure 11:
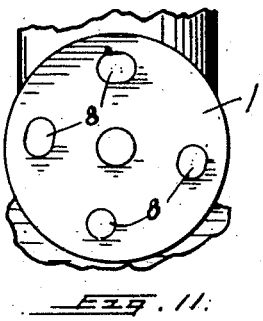
Figure 12:
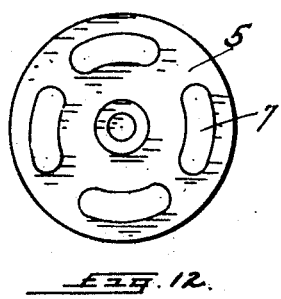
Figure 13:
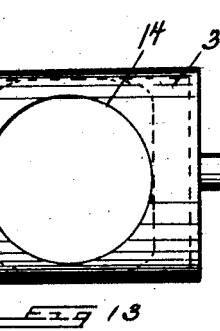
Figure 14:
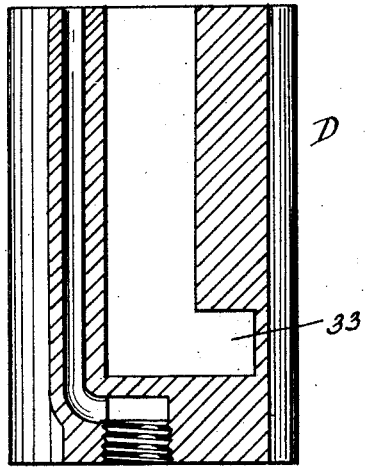
Figure 15:
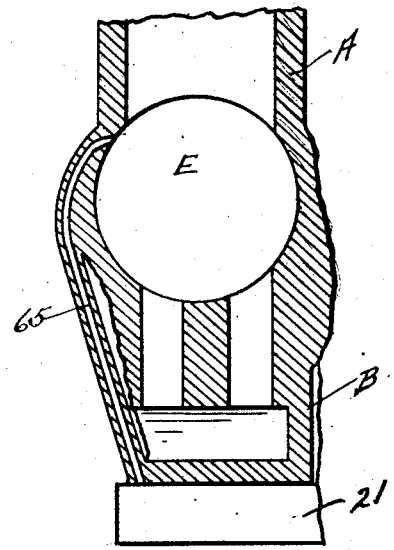

In the drawings in which I have shown the best and most preferred form of constructing my invention, Figure 1 is a side elevation of my device. Figure 2 is an end elevation of the tank end of my device. Figure 3 is a plan view of the device. Figure 4 is an end elevation of the mixing end of my device. Figure 5 is a vertical longitudinal section of the device, enlarged from the other views. Figure 6 is a plan view of the vacuum tank and valve casing opening into said tank. Figure 7 is a side elevation of the air valve stems and plunger. Figure 8 is an elevation of the air valve within its housing, and the float and its connection in elevation. Figure 9 is an enlarged view in section of the float and friction holding support. Figure 10 is the air regulating plate. Figure 11 is the valve against which the said plate bears. Figure 12 is an end view of the air valve, showing the ports which are brought into alinement with the holes in the air regulating plate. Figure 13 is a side elevation of the air control valve. Figure 14 is a longitudinal section on line 14—14 of Figure 1. Figure 15 is a diagrammatic section showing the idling conduit from the float chamber to the throttle valve chamber.

The specially new and essential features of my invention are to provide a carburetor wherein the flow of gasoline to the mixing chamber is determined and regulated by the air passing through the mixing chamber, as regulated by the suction of the pistons of the engine. I thus regulate the amount of gasoline used in the operation of the engine by the amount of air drawn through the device by the suction of the pistons of the engine commensurate with the speed and load carried by the engine, and to shut off all of the gasoline when the engine is running by momentum or gravity, as going down an incline In the drawings I have shown the casing as consisting of a vertical casing A, with an integral cross-casing B having a choker inlet tube C, and with a cylindrically-shaped vacuum tank D secured on the upper side of said cross-casing B. The said casing A has its medial portion transversely cut by the throttle valve casing E. The throttle casing E is closed at one end by the perforated flatted portion 1 of the said casing A, and at the other end by the end plate 2. The throttle valve is a cylindrically-shaped hollow drum 3, having a solid head in one end to support the stub shaft 4, on which is secured an arm 4ª, and a perforated head 5 in its other end, as shown in Figure 5, and on which the stub shaft 6 is integrally formed or secured in alinement with the said stub shaft 4. The said stub shaft 6 is journalled axially in the flatted portion of the casing A and perforated head 5 of said throttle valve drum 3. The perforations in the drum head 5 are spaced apart arc-shaped slots 7 which are adapted to be brought into alinement with the round perforations 8 in the flattened end 1 of the wall of the throttle valve cylinder (see Figure 11). An air regulating plate 9 is carried on the stub shaft 6, with a lever arm 9ª secured thereon, and has perforations 10, 11 and 12 therein. The perforations 10 are round and the perforations 11 and 12 are arc-shaped slots. In the side walls of said throttle valve drum 3 are cut a circular opening 14, and diametrically opposite an elongated slot 15. The casing A has four perforations or openings 17 bored therein (see Figure 3), which openings extend through the lower portion thereof (see Figure 5). The extreme lower portion of said openings 17 are threaded, as at 16, to receive the four plugs 18. On the exterior and upper end of each of said plugs is secured the hollow mixers 19, each of which is made of spirally curved wire, the convolutions of which are close together, and the upper end portions are contracted to close the opening through them. A central longitudinal opening or conduit 20 is bored through each of said plugs 18, through which gasoline flows to the interior of said mixers 19, when the openings 14 and 15 are in alinement with the interior of said casing A. A float chamber 21 is provided in one end of the casing B, within which chamber the float 22 is mounted by pivoting one edge on a pin 23 held at its ends in the bracket 64 of the casing B. The vacuum tank D is closely fitted within the upper side of said casing B and at an angle thereto by a tap screw 24 which is passed through a hole centrally bored in the bottom of said tank and screwed into the upper wall of the casing B (see Figure 5). The upper portion $B^1$ of the casing B and the lower portion $D^1$ of the vacuum tank D form a gasoline chamber F, in which gasoline is stored after it leaves the tank D and before it is needed in the float chamber 21. A needle valve 25 is mounted upon the upper side of the float 22 and seats in a valve seat 26 cut in the upper wall of the casing B. A hole 27 connects the storage chamber F with the float chamber and the supply of gasoline is regulated by the valve 25. Another valve 28 is carried in the upper chamber of the vacuum tank D and seats in a valve seat 29 cut in a hole 30 bored through the wall between the upper chamber D and the chamber $D^1$. Two cylindrical casings 31 and 32 are formed on one side of the vacuum tank D and form the casings in which the needle valves are carried and operated for controlling the release air, the gasoline supply and the gasoline outlet. The lower ends of the two casings are connected by the cross chamber 33 and both are in open connection with the interior of the vacuum tank. A central rod 34 is screwed into the upper end of the tap screw 24, and the upper end is threaded to receive the nut 35 which holds the closure cap 36 in place on the vacuum tank D. The said rod 34 is longitudinally slotted to receive the lever 37 which is pivoted thereto by the pin 38. The lever 37 is given the form of a bell crank lever and the lower and free end of the crank is weighted, as at 39. The upper end of the said lever 37 is formed into a catch 40. A float 41 is longitudinally carried on said rod 34 and is moved up and down the length of the said rod by the amount of gasoline in the vacuum tank D. A cylindrical spool 42 is carried on the rod 34 above the float 41 and the central bore of said spool 42 is contracted or inwardly flanged, at the upper end, as at 43, and in which flange the end 40 of the lever 37 catches, holding the spool up on the rod 34 until the gasoline in the tank D has been allowed to flow out in sufficient quantity to allow the float 41 to rest on the lower portion of the lever 37. When the lever 37 is thus moved the spool is released and slides down the rod 34. A bifurcated lever 44 is pivoted at one side of the cylindrical casing 31 and the free bifurcated end 45 of said lever 44 engages with the ends of the said spool 42. A valve stem 46 is pivotally mounted to said lever 44 and has a needle valve 47 formed on its upper end, which valve seats in a valve seat 48 cut in the upper end of the said cylinder 31 and said valve stem 46 is freely carried in a plunger 49, to allow passage of air therearound. The said valve 47 controls the amount of air suction which is allowed to enter into the vacuum tank D, from the engine of the vehicle. The upper end of the said cylindrical casing 31 is internally threaded to receive the connection to the intake manifold which supplies the necessary air suction to the vacuum tank. A slidable plunger 49 is carried in the said cylindrical casing 31 and is formed in a frame shape so that the lever 44 can operate therethrough without interference. The lower end of the plunger is connected with the needle valve 28 by the valve stem 50, which has a flanged portion 58 thereon. A valve seat 51 is provided in the casing 32 and a needle valve 52 controls the amount of gasoline allowed to enter through said valve seat 51. A valve stem 53 is connected to the lower side of said needle valve 52 and has a flanged portion 54 formed near its lower end, and the lower end thereof seats in a socket 56 bored in the lower end of the casing 32. A lever 55 is centrally pivoted to the vacuum tank D by the bracket 57 and the free ends of the lever 55 connect with the two valve stems 53 and 50 under the flanged portions 54 and 58, forcing one of the stems up when the other is down, and the reverse. When the plunger 49 is lowered the valve 28 will be opened, and a weighted lever 70 will be moved on its pivot and open the valve 66, and allow air to enter the vacuum tank and the gasoline will flow freely from the tank D to the chamber F. Threaded plugs 60 are screwed into the lower ends of the cylindrical casings 31 and 32 to close them. Closure plugs 61 and 62 are screwed into the bottom of the casing B and when removed leave holes in which to work on the float and the spiral coils 19.

The operation of my carburetor is as follows:—

Gasoline is drawn into the vacuum tank D through the valve 52 when the motor is rotated and suction is created in the pistons. The air suction will then draw the plunger 49 upwardly and the valve 28 will be closed and through the rocker lever 55 the valve 52 will be opened, and the release air valve 66 will be closed. Gasoline will then enter the chamber D and as sufficient amount is allowed to enter the float, will rise on the rod 34 forcing the spool 42 upwardly and at a predetermined point the bifurcated lever 44, having its ends 45 engaged with the said spool 42, will force the valve stem 46 upwardly and will seat the valve 47 in its seat 48, thus shutting off the air suction inside the tank D. When the suction is thus cut off the plunger 49 will fall and being connected with the valve 28 by the stem 50, the valve will be opened and gasoline will flow through the hole 30 into the supply chamber E. When the float in the float chamber 21 is down and there is no gasoline or just a small amount, the valve 26 will be opened and as the gasoline enters the chamber F, it will flow through the opening 27 into the float chamber 21. As the engine is rotated the suction from the intake manifold will draw up through the casing A and gasoline will be drawn through the coils 19 into the chamber E, where it will be mixed with the required amount of air drawn through the openings in the end of said chamber and the resulting mixture will be drawn into the cylinders of the engine and will furnish fuel therefor. When the float chamber is filled with the required amount of gasoline, the float 22 will rise and the valve 26 will be closed in its seat. Gasoline will then fill up the reserve chamber F and the float chamber D of the vacuum tank until the float 41 rises and closes the air suction. When the air suction is shut off the plunger 49 will fall down and the lever 55 will close off the supply of gasoline and the air valve will be opened. No more gasoline will be allowed to enter until the float 41 has been lowered enough to rest on the lever 37. The spool 42 will then be released and will fall to the level of the float. This will draw the lever 45 downwardly and will again open the air suction through the valve 47.

When it is desired to idle the engine, the cylinder 3 will be rotated just enough to open the end of the idling supply pipe 65 connected with the chamber 21, and just sufficient gasoline will be drawn through the pipe 65 to keep the engine running at very slow speed. To increase the speed of the engine, the cylinder is rotated more and more air is allowed to enter through the holes 10, 11 and 12, and increased suction draws more gasoline through the coils 19, speeding up the engine any desired amount. The farther the cylinder 3 is turned the more suction and, consequently, the more gasoline drawn through the coil 19, and more air through the end of the cylinder chamber E and the air inlet C. When the control cylinder 3 is entirely closed, the idling tube 65 will be closed and allow the engine to run down inclines without any supply of gasoline to the engine and thus the engine will be used as a brake for the vehicle.

Having thus described my invention I desire to secure by Letters Patent and claim:—

1. A vacuum tank comprising a float chamber; a float operable therein; a plunger chamber with open connection to said float chamber; a plunger operable in said plunger chamber; a lever operable by said float and pivoted in said plunger casing; a valve stem pivoted on said lever; a valve on said stem adapted to regulate the suction of air in said plunger chamber and vacuum chamber; a depending valve stem carried on said plunger; a rocker lever operable by said valve stem to open and close a needle valve to regulate the flow of gasoline into said vacuum tank; an air inlet in the top of said tank controlled by the movement of said plunger and a valve on said stem to regulate the flow of gasoline from said tank.

2. A vacuum tank having parallel chambers opening to the interior of said tank; a float operable in said tank and carried on a rod; a longitudinally disposed slot in said rod; a bell crank lever pivoted in the slot in said rod; a spool carried on said rod and having a flange portion with a contracted opening adapted to engage the end portion of said bell crank lever when said spool is supported by said float, and to be released from said engagement when the spool is not supported by said float; a lever engaging the flange of said spool; a valve operable by said lever to allow air to be drawn from said tank; a plunger carried in a casing adjacent said vacuum chamber and in open connection therewith; another casing adjacent said first-mentioned casing, connected with the gasoline supply tank and in open connection with said vacuum chamber; a plunger carried in said first-mentioned casing; means to allow air to enter said tank and to shut off said air when necessary; a valve stem depending from said plunger; a valve on the end of said stem to shut off the flow of gasoline from said vacuum tank; another valve stem in the second-mentioned casing; a valve on the upper end of said stem; and a lever having its ends connected with said valve stems and operable by said stems.

In testimony whereof I have affixed my signature.

THEODORE BOSSARD.